United States Patent
Beifus

(10) Patent No.: US 7,436,138 B2
(45) Date of Patent: Oct. 14, 2008

(54) METHODS AND SYSTEMS FOR EMULATING AN INDUCTION MOTOR UTILIZING AN ELECTRONICALLY COMMUTATED MOTOR

(75) Inventor: Brian L. Beifus, Ft. Wayne, IN (US)

(73) Assignee: Regal-Beloit Corporation, Beloit, WI (US)

( * ) Notice: Subject to any disclaimer, the term of this patent is extended or adjusted under 35 U.S.C. 154(b) by 246 days.

(21) Appl. No.: 11/365,062

(22) Filed: Mar. 1, 2006

(65) Prior Publication Data

US 2007/0205732 A1 Sep. 6, 2007

(51) Int. Cl.
*H02P 7/00* (2006.01)

(52) U.S. Cl. .................. 318/432; 318/362; 318/254; 388/825

(58) Field of Classification Search .......... 318/432, 318/362; 388/825
See application file for complete search history.

(56) References Cited

U.S. PATENT DOCUMENTS

| | | | |
|---|---|---|---|
| 4,230,976 A | 10/1980 | Muller | |
| 4,500,821 A | 2/1985 | Bitting et al. | |
| 5,006,744 A * | 4/1991 | Archer et al. | 310/89 |
| 5,510,689 A * | 4/1996 | Lipo et al. | 318/809 |
| 5,592,058 A * | 1/1997 | Archer et al. | 318/400.09 |
| 6,107,761 A * | 8/2000 | Seto et al. | 318/139 |
| 6,262,510 B1 | 7/2001 | Lungu | |
| 6,271,638 B1 | 8/2001 | Erdman et al. | |
| RE37,576 E | 3/2002 | Stephens et al. | |
| 6,369,535 B1 | 4/2002 | Wang et al. | |
| 6,369,536 B2 | 4/2002 | Beifus et al. | |
| 6,456,023 B1 | 9/2002 | Becerra et al. | |
| 6,465,977 B1 * | 10/2002 | Farkas et al. | 318/432 |
| 6,768,279 B1 * | 7/2004 | Skinner et al. | 318/254 |
| 6,853,159 B2 | 2/2005 | Kolomeitsev et al. | |
| 6,895,176 B2 * | 5/2005 | Archer et al. | 388/825 |
| 6,992,403 B1 | 1/2006 | Raad | |
| 2003/0223738 A1 | 12/2003 | Hughes et al. | |
| 2005/0206335 A1 * | 9/2005 | Strike et al. | 318/439 |
| 2006/0043916 A1 | 3/2006 | Henslee et al. | |

* cited by examiner

*Primary Examiner*—Lincoln Donovan
*Assistant Examiner*—Antony M. Paul
(74) *Attorney, Agent, or Firm*—Armstrong Teasdale LLP

(57) ABSTRACT

A method for emulating induction motor operation using an electronically commutated motor (ECM) is described herein. The method includes receiving, at the ECM, a desired operating torque, accessing induction motor operating characteristics stored within the ECM, and calculating a new torque demand if a speed associated with the desired operating torque is greater than a breakdown speed of the induction motor. The method also includes setting an output torque for the motor substantially equal to the torque demand for the motor if the speed associated with the desired operating torque is less than the breakdown speed of the induction motor, moving the output torque toward the demanded torque if not substantially equal, and operating the motor at the output torque.

16 Claims, 5 Drawing Sheets

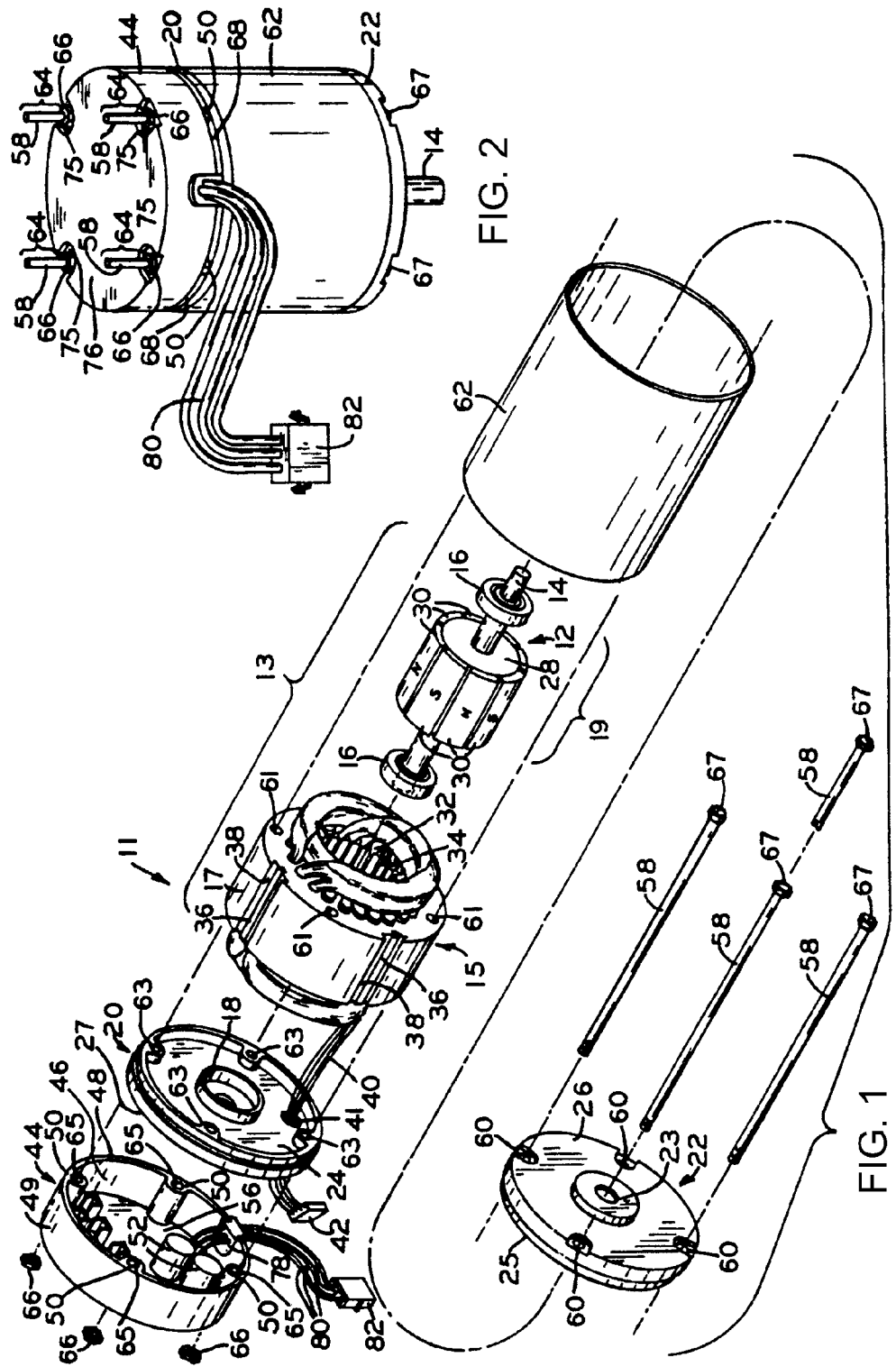

| | |
|---|---|
| n | 2.5 |
| NL speed | 1200 |
| BD speed | 1050 |

Option 1   $(1-(Spd - Bdspeed)^n / (Nlspeed - Bdspeed)^n$
Option 2   above, with Bdspeed = NLspeed − pct torque * (NL speed − 1050)

METHODS AND SYSTEMS FOR EMULATING AN INDUCTION MOTOR UTILIZING AN ELECTRONICALLY COMMUTATED MOTOR

BACKGROUND OF THE INVENTION

This invention relates to electrically commutated motors, and more particularly, to methods and approaches used to control the operating characteristics of an electrically commutated motor, specifically, emulating operation of an induction motor.

Electrically commutated motors (ECMs) are used in a wide variety of systems operating in a wide variety of industries. As such, the ECMs are subject to many operating conditions and often, the operating conditions necessitate that the operating characteristics of the ECM be changed to match the requirements of the associated application (i.e. different speeds or airflow requirements for heating, cooling, and constant fan for residential HVAC applications). Because of the complexity of the many possible desired operating characteristics, it may be difficult to remove, for example, an induction motor from one system and replace it with an ECM. More specifically, the ECM control circuits and interfaces must typically be changed to enable the ECM to operate with different operating characteristics in different applications.

In a furnace or air conditioning blower system, the speed torque characteristics become an integral part of the design and ratings of that system. When such a system is upgraded to use a brushless DC motor (ECM), rather than an induction motor, the characteristics that depend on the speed torque curve of the induction motor have to be re-evaluated. The re-evaluation occurs since the ECM motor does not have the same characteristic speed torque curve, and in fact is quite likely to have a performance envelope that includes a capability of operating at several hundred RPM faster than the induction motor's capabilities. This operational characteristic of an ECM can result in the target blower system having higher wheel speeds under some conditions than it did when the blower system was equipped with an induction motor. Another result of replacing the induction motor with the ECM is that fault condition operation or safety limit functions, for example, over temperature limit switch operation, is different within an ECM. As such, these operations and function are typically retested and validated upon replacement of an induction motor with an ECM. Retesting and validation of motor operation is expensive.

BRIEF DESCRIPTION OF THE INVENTION

In one aspect, a method for emulating induction motor operation using an electronically commutated motor (ECM) is provided. The method comprises receiving, at the ECM, a desired operating torque, accessing induction motor operating characteristics stored within the ECM, and calculating a new torque demand if a speed associated with the desired operating torque is greater than a breakdown speed of the induction motor. The method further comprises setting an output torque for the motor substantially equal to the torque demand for the motor if the speed associated with the desired operating torque is less than the breakdown speed of the induction motor, moving the output torque toward the demanded torque if not substantially equal, and operating the motor at the output torque.

In another aspect, an electronically commutated motor is provided. The electronically commutated motor comprises a permanent magnet DC brushless motor comprising a plurality of external winding connections coupled to an external surface of the electronically commutated motor, at least one stator winding electrically coupled to said plurality of external winding connections, an electronic commutator electrically coupled to the DC brushless motor, and a control circuit programmed with motor operating characteristics that cause the permanent magnet DC brushless motor to emulate operation of an induction motor.

BRIEF DESCRIPTION OF THE DRAWINGS

FIG. 1 is an exploded view of an integrated electronically commutated motor (ECM) and control circuit assembly.

FIG. 2 is a fully assembled view of the ECM and control circuit assembly of FIG. 1.

DETAILED DESCRIPTION OF THE INVENTION

Figure 3:
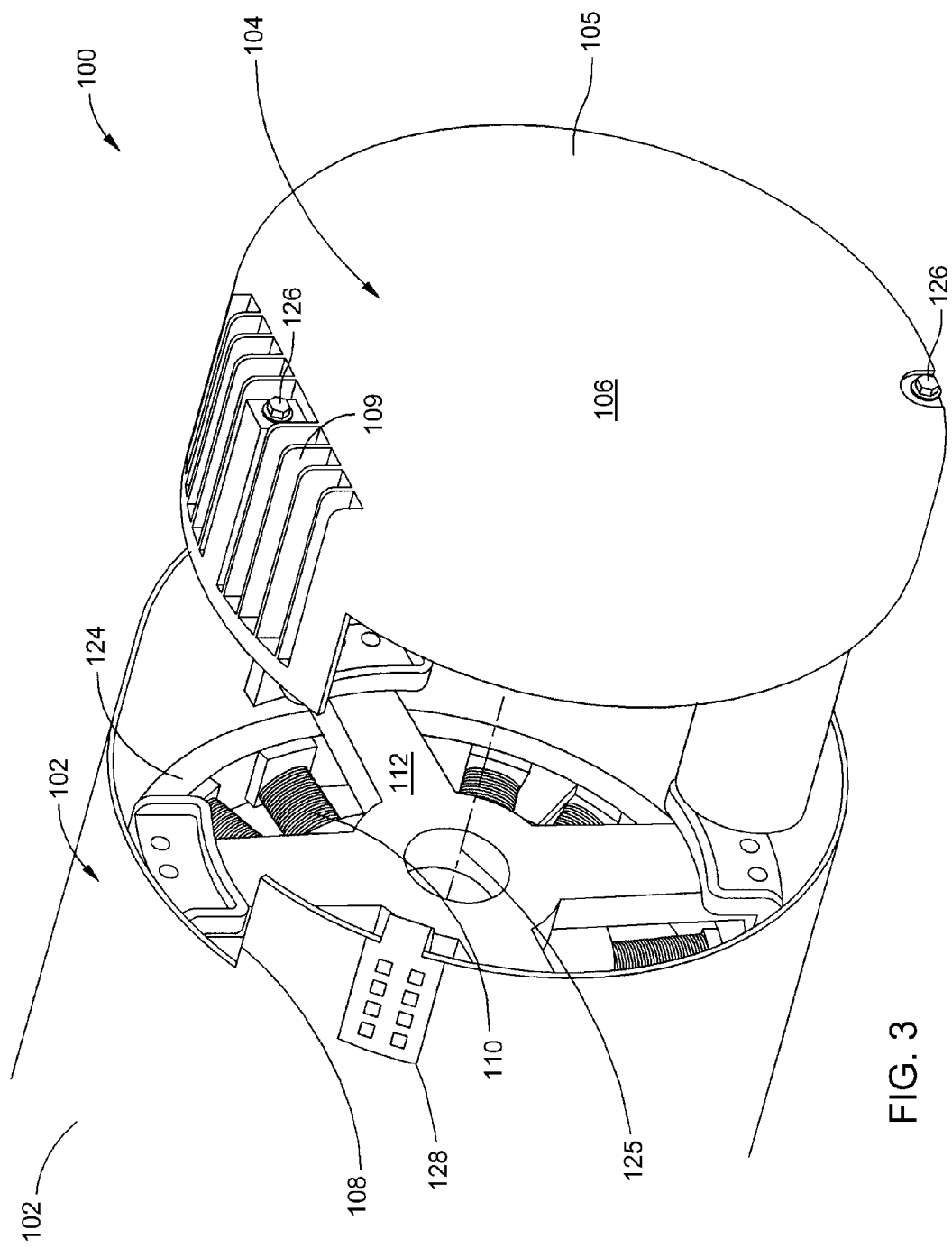
FIG. 3 is an exploded partial view of an ECM having a control circuit that fits into the main chassis of the ECM.

Controlling the torque of an electronically commutated motor (ECM) to mimic the speed torque curve of a typical induction motor, which is sometimes referred to as a permanent, split capacitor (PSC) motor is described herein. More specifically described is the reproduction of the part of the speed torque curve for an induction motor above the breakdown speed of the induction motor.

Described herein are methods and systems for using dynamic braking to reduce the time required to slow rotation of an electronically commutated motor (ECM) to a stop. As is known in the art, ECMs are routinely used to power blowers and fans. However, and as described above, allowing an ECM to coast to a stop after removal of power has drawbacks such as passing through resonant frequencies of various components of the ECMs. In addition, reverse rotation in an inverse pressure situation also is a cause for concern. The principles for dynamic braking of an ECM (e.g., a brushless DC motor) is known, however applying such principles to a direct drive ECM blower, to actively hold an ECM in a stopped position, may also provide further advantages to a user.

Referring to the drawings, and more particularly to FIGS. 1 and 2, reference character 11 generally designates an integrated electronically commutated motor and control circuit assembly. Motor assembly 11 comprises a brushless electronically commutated DC motor 13 having a stationary assembly 15 including a stator or core 17 and a rotatable assembly 19 including a permanent magnet rotor 12 and a shaft 14. A fan (not shown) or other means to be driven such as means for moving air through an air handling system engages the shaft 14. Specifically, motor assembly 11 is for use in combination with an air handling system such as an air conditioning system including a fan for blowing air over cooling coils for supplying the cooled air to a building.

Rotor 12 is mounted on and keyed to the shaft 14 journaled for rotation in conventional bearings 16. The bearings 16 are mounted in bearing supports 18 integral with a first end member 20 and a second end member 22. The end members 20 and 22 are substantially flat and parallel to each other. The end members 20 and 22 have inner facing sides 24, 25 between which the stationary assembly 15 and the rotatable assembly 19 are located. Each end member 20 and 22 has an outer side 26, 27 opposite its inner side 24, 25. Additionally, second end member 22 has an aperture 23 for the shaft 14 to pass through and extend out from the outer side 26.

The rotor 12 comprises a ferromagnetic core 28 and is rotatable within the bore of stator 17. Eight essentially identical magnetic material elements or relatively thin arcuate segments 30 of permanent magnet material, each providing a relatively constant flux field, are secured, for example, by adhesive bonding to rotor core 28. The segments 30 are magnetized to be polarized radially in relation to the rotor core 28 with adjacent segments 30 being alternately polarized as indicated. While magnets 30 on rotor 12 are illustrated for purposes of disclosure, it is contemplated that other rotors having different constructions and other magnets different in both number, construction, and flux fields may be utilized with such other rotors within the scope of the invention so as to meet at least some of the objects thereof.

Stationary assembly 15 comprises a plurality of winding stages 32 adapted to be electrically energized to generate an electromagnetic field. Stages 32 are coils of wire wound around teeth 34 of the laminated stator core 17. The core 17 may be held together by four retainer clips 36, one positioned within each notch 38 in the outer surface of the core 17. Alternatively, the core 17 may be held together by other suitable means, such as for instance welding or adhesively bonding, or merely held together by the windings, all as will be understood by those skilled in the art. The winding end turns extend beyond the stator end faces and winding terminal leads 40 are brought out through an aperture 41 in the first end member 20 terminating in a connector 42. While stationary assembly 15 is illustrated for purposes of disclosure, it is contemplated that other stationary assemblies of various other constructions having different shapes and with different number of teeth may be utilized within the scope of the invention so as to meet at least some of the objects thereof.

Motor assembly 11 further includes a cap 44 which is mounted on the rear portion of the motor assembly 11 to enclose within the cap 44 control means 46 for the motor 13. The cap 44 includes an edge 48 having a plurality of spacing elements 50 projecting therefrom which engage the outer side 27 of the first end member 20. Cap 44 includes a substantially annular side wall 49 with the top of the side wall 49 forming edge 48. The control means 46 is positioned adjacent the outer side 27 of the first end member 20. The control means 46 includes a plurality of electronic components 52 and a connector (not shown) mounted on a component board 56, such as a printed circuit board. The control means 46 is connected to the winding stages 32 by interconnecting connector 42 and connector (not shown). The control means 46 applies a voltage to one or more of the winding stages 32 at a time for commutating the winding stages 32 in a preselected sequence to rotate the rotatable assembly 19 about an axis of rotation.

Connecting elements 58 comprising a plurality of bolts pass through bolt holes 60 in the second end member 22, bolt holes 61 in core 17, bolt holes 63 in first end member 20, and bolt holes 65 in cap 44. The head 67 of the connecting elements 58 engage the second end member 22. The connecting elements 58 are adapted to urge the second end member 22 and the cap 44 toward each other thereby supporting the first end member 20, the stationary assembly 15, and the rotatable assembly 19 therebetween. Additionally, a housing 62 may be positioned between the first end member 20 and the second end member 22 for enclosing and protecting the stationary assembly 15 and the rotatable assembly 10.

Electronically commutated motor 13 as described herein merely for purposes of disclosure is an eight rotor-pole motor, but it will be understood that the electronically commutated motor of this invention may include any even number of rotor poles and the number of stator poles are a multiple of the number of rotor poles, for example, the number of stator poles may be based on the number of phases. In one exemplary embodiment not shown in the Figures, a three-phase ECM includes six rotor pole pairs and 18 stator poles.

The motor assembly 11 according to the invention operates in the following manner. When the winding stages 32 are energized in a temporal sequence three sets of eight magnetic poles are established that will provide a radial magnetic field which moves clockwise or counterclockwise around the core 17 depending on the preselected sequence or order in which the stages are energized. This moving field intersects with the flux field of the magnet 30 poles to cause the rotor to rotate relative to the core 17 in the desired direction to develop a torque which is a direct function of the intensities or strengths of the magnetic fields.

The winding stages 32 are commutated without brushes by sensing the rotational position of the rotatable assembly 19 as it rotates within the core 17 and utilizing electrical signals generated as a function of the rotational position of the rotor 12 sequentially to apply a DC voltage to each of the winding stages 32 in different preselected orders or sequences that determine the direction of the rotation of the rotor 12. Position sensing may be accomplished by a position-detecting circuit responsive to the back electromotive force (EMF) to provide a simulated signal indicative of the rotational position of the rotor 12 to control the timed sequential application of voltage to the winding stages 32 of the motor 13. Other means of position sensing may also be used.

FIG. 2 illustrates the fully assembled motor assembly 11. Connecting elements 58 pass through the second end member 22, the stationary assembly 15, the first end member 20, and the cap 44. The connecting elements 58 have a portion 64 which projects laterally from the cap 44. Portion 64 is adapted to engage a support structure (not shown) for supporting the motor assembly 11. The connecting elements 58 may be secured in place by placing a nut 66 engaging the threads on each of the portions 64 of the connecting elements 58. A wiring harness 80 and connector 82 are utilized to connect motor assembly 11 to an electrical power source.

Spacing elements 50 when engageable with the outer side 27 of the first end member 20 form air gaps 68 between the spacing elements 50, the edge 48, and the outer side 27. The air gaps 68 permit flow through the cap 44 thereby dissipating heat generated by the motor assembly 11. Additionally, if the motor assembly 11 is exposed to rain the air gaps 68 permit rain which has entered the cap 44 to flow out of the cap 44 via the air gaps 68.

Indentations 75 are formed in a bottom 76 of the cap 44 which provide a space for a tool (not shown) to fit in to tighten the nuts 66. The indentations 75 also allow the nuts 66 to be mounted on the connecting elements 58 flush with the bottom 76 of the cap 44.

FIG. 3 is an exploded end view of an alternative embodiment for an ECM 100. Motor 100 includes a motor enclosure 102 and a motor control unit 104 configured for attachment to motor enclosure 102. A chassis 105 of motor control unit 104 serves as an end shield 106 for motor 100. Motor enclosure 102 also includes a slot 108 which engages a heat sink 109 formed in chassis 105 as further described below. While motor control unit 104 includes chassis 105, motor 100 is configured such that motor enclosure 102 provides substantially all of the enclosure for motor control unit 104. Within motor enclosure 102 are windings 110 of motor 100 and a mid shield 112 configured for placement between windings 110 and motor control unit 104.

The placement and configuration of mid shield 112 allows motor control unit 104 of motor 100 to be removed and replaced without disruption or displacement of a motor winding assembly 124 which includes windings 110 of motor 100. As illustrated, motor enclosure 102 is configured to form a part of the enclosure for motor control unit 104, along with end shield 106, allowing for a one-piece enclosure configuration. Mid shield 112 is also configured to meet any airflow, voltage clearances and assembly height limitations imposed on motor 100.

In one embodiment, as illustrated, mid shield 112 fits precisely with respect to a centerline 125 of motor 100 and further aligns with two bolts 126 that pass through end shield 106 of motor control unit 104 to clamp and secure mid shield 112 and motor control unit 104 within motor enclosure 102. This alignment and symmetry remain even when chassis 105 containing the electronics of motor control unit 104 is removed. Retaining the alignment and symmetry within enclosure 102 is important as it lowers a replacement cost of motor control unit 104 in the field. Mid shield 112 also contributes to a lower material cost for motor 100, because with mid shield 112, motor enclosure 102 is utilized as a part of the containment enclosure for portions of motor control unit 104 as shown in FIG. 3, decreasing the size of motor 100 as compared to motor 11 (shown in FIGS. 1 and 2). Additionally, such a configuration allows for a placement of a power connector 128 that is flush with chassis 102.

Utilization of mid shield 112 allows motor control unit 104 to be removed from enclosure 102 without disturbing the rest of the motor assembly, for example, windings 110. The non-disturbance is obtained by using mid shield 112 to secure a bearing that engages a motor shaft (neither shown in FIG. 1) of motor 100. Therefore, enclosure 102 is additionally configured to provide any required clearances for the electrical components (e.g., motor control unit 104) of motor 100 to allow disengagement of motor control unit 104 from motor 100.

Figure 4:
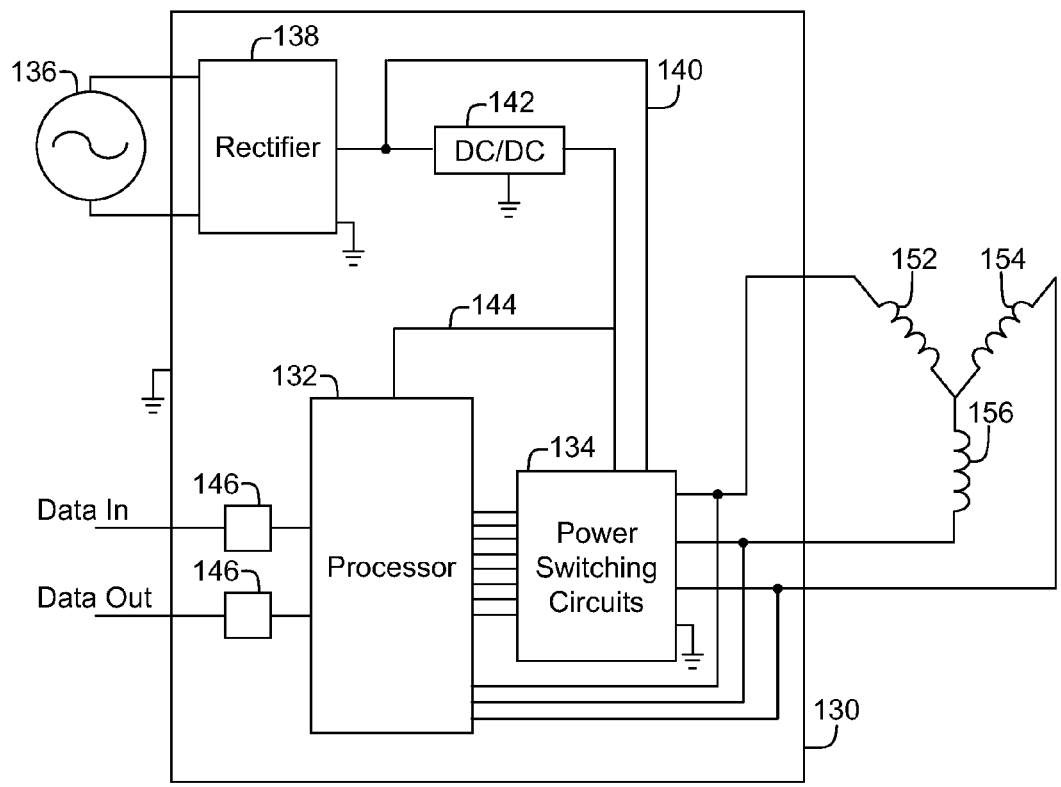
FIG. 4 is a block diagram of a control circuit of an ECM.

FIG. 4 is a simplified block diagram of an ECM control circuit 130 that includes a processor 132 and power switching circuits 134. Typically, an ECM is powered utilizing an AC voltage 136 that is rectified by a rectifier 138 to provide a high voltage DC source 140 to power the windings of an ECM. A DC/DC converter 142 is utilized to provide an operating voltage 144 for processor 132 and power switching circuits 134. Isolation devices 146 are utilized to electrically isolate processor 132 from external devices while allowing communications to and from the external devices. As further described below, processor 132 is programmed to operate power switching circuits 134 to selectively connect (and disconnect) windings 152, 154, and 156 of the ECM to the high voltage DC source 140 to cause a rotation of a rotor of the ECM. Additionally, and in one embodiment, ECM control circuit 130 is configured to include one or more circuits for determining a speed and torque associated with operation of the ECM.

In operation, circuitry of ECM control circuit 130 is configured according to the user's requirements. The circuitry may be configured as any of the following non-exclusive circuits alone or in combination, for example, a power supply regulating circuit, an electromagnetic interference filter, an electronically commutated motor speed modulator, an electronically commutated motor torque modulator, a transient suppression circuit, an active power factor correction circuit, a passive power factor correction circuit and a process parameter control circuit. However, this list should not be construed as limiting as other circuitry configurations exist.

In a particular embodiment, the ECM assemblies described with respect to of FIGS. 1-4 is configured to provide high speed performance similar to an induction motor, such that the impact on system performance where the induction motor is replaced with an ECM is minimized. In the embodiment, ECM control circuit 130 includes an ECM speed modulator, and an ECM motor torque modulator. In addition, key characteristic points of the induction motor curve are stored in the ECM memory. These characteristic points typically include breakdown speed, no load (or synchronous) speed, and a shape description number that controls tile shape of the curve between the breakdown speed and the no load speed. When the motor speed is between the breakdown speed and the no load speed, the torque is scaled by a factor less than one, that is calculated using breakdown speed, no load speed and the shape description number, which is sometimes referred to herein as "n". At the same time, the allowed rate of change of the motor torque is reduced, in one embodiment, stepped, in order to guarantee dynamic stability.

Figure 5:
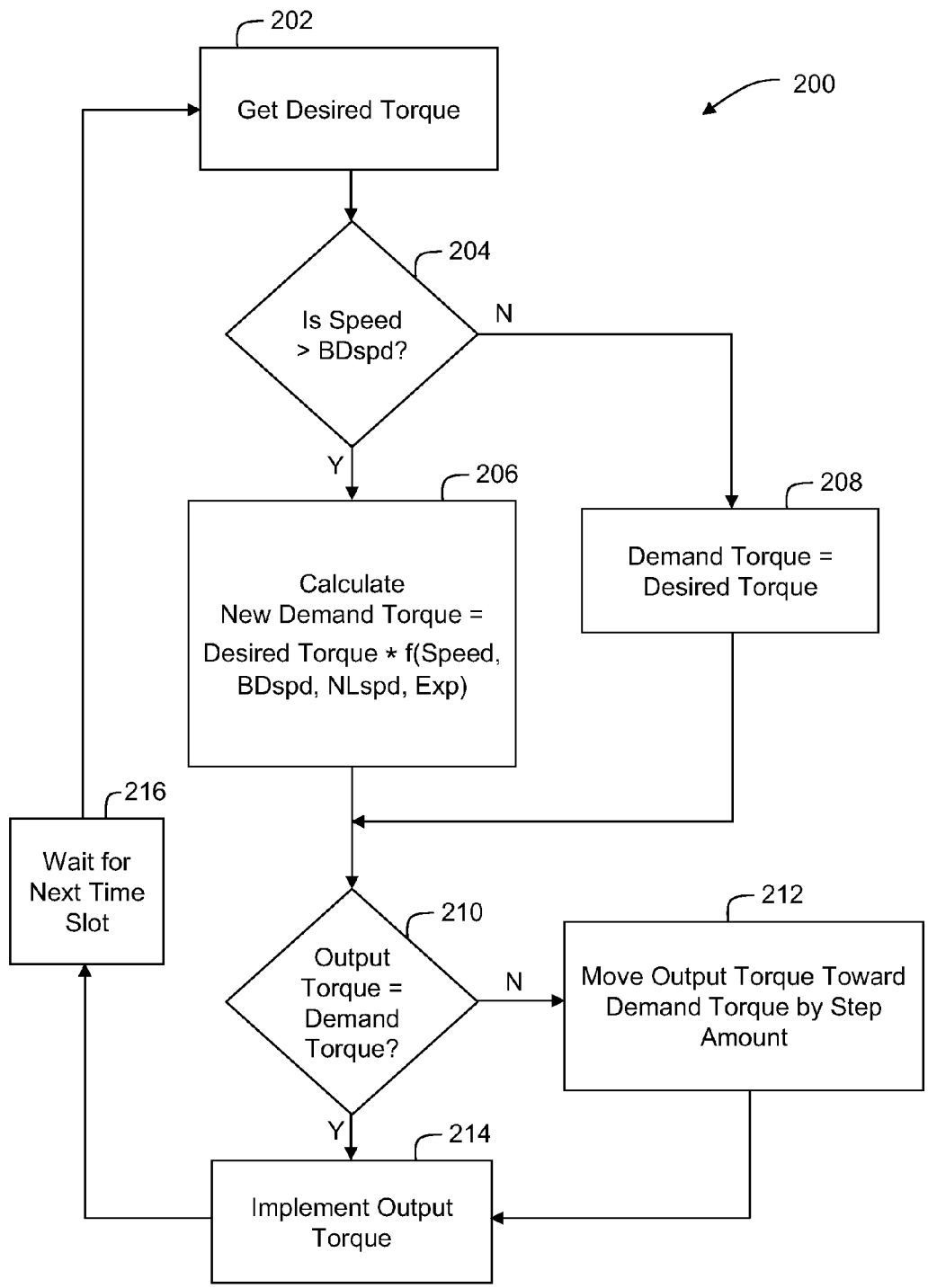
FIG. 5 is a flowchart illustrating emulation of an induction motor using an ECM.

FIG. 5 is a flowchart 200 illustrating one method for emulating induction motor operation utilizing an ECM. Specifically, the method includes receiving 202 a desired operating torque at the ECM control circuit 130, and then accessing induction motor operating characteristics stored within the ECM control circuit. It is then determined 204, if the ECM operating speed is greater than the induction motor breakdown speed. A new torque demand is calculated 206 if a speed associated with the desired operating torque is greater than a breakdown speed of the induction motor, and a demand torque for the motor is set 208 to be substantially equal to the desired operating torque for the motor if the speed associated with the desired operating torque is less than the breakdown speed of the motor. It is then determined 210 if the output torque is substantially equal to the torque demand. The output torque is moved 212 toward the demanded torque if not substantially equal, and the motor is operated 214 at the output torque. In one embodiment, the output torque is moved 212 toward the demanded torque by slowly stepping the output torque toward the demanded torque, to ensure dynamic stability in the operation of the ECM.

Additionally, the motor is operated 214 at the output torque if the output torque and demanded torque are substantially equal. The steps are then repeated 216 at the next available processing cycle of the ECM control circuit 130.

In alternative embodiments, the new torque demand is calculated 206 based on one or both of the desired operating torque and as a function of at least one of desired operating torque, motor operating speed, induction motor breakdown speed, induction motor no load speed, and an exponential value n. In these embodiments, a new torque demand may be calculated according to:

$$\text{Desired operating torque} \times \left[1 - \frac{(i.m.\ \text{operating speed} - i.m.\ \text{breakdown speed})^n}{(i.m.\ \text{noload speed} - i.m.\ \text{breakdown speed})^n}\right]$$

where n is a real number stored in a memory of the ECM and i.m. means "induction motor". In a specific embodiment, n=2.5, induction motor noload speed is 1200 rpm, and induction motor breakdown speed is 1050 rpm. In an alternative embodiment, induction motor breakdown speed is replaced with:

i.m. noload speed−per unit torque demand×(i.m. noload speed−i.m. breakdown speed).

Figure 6:
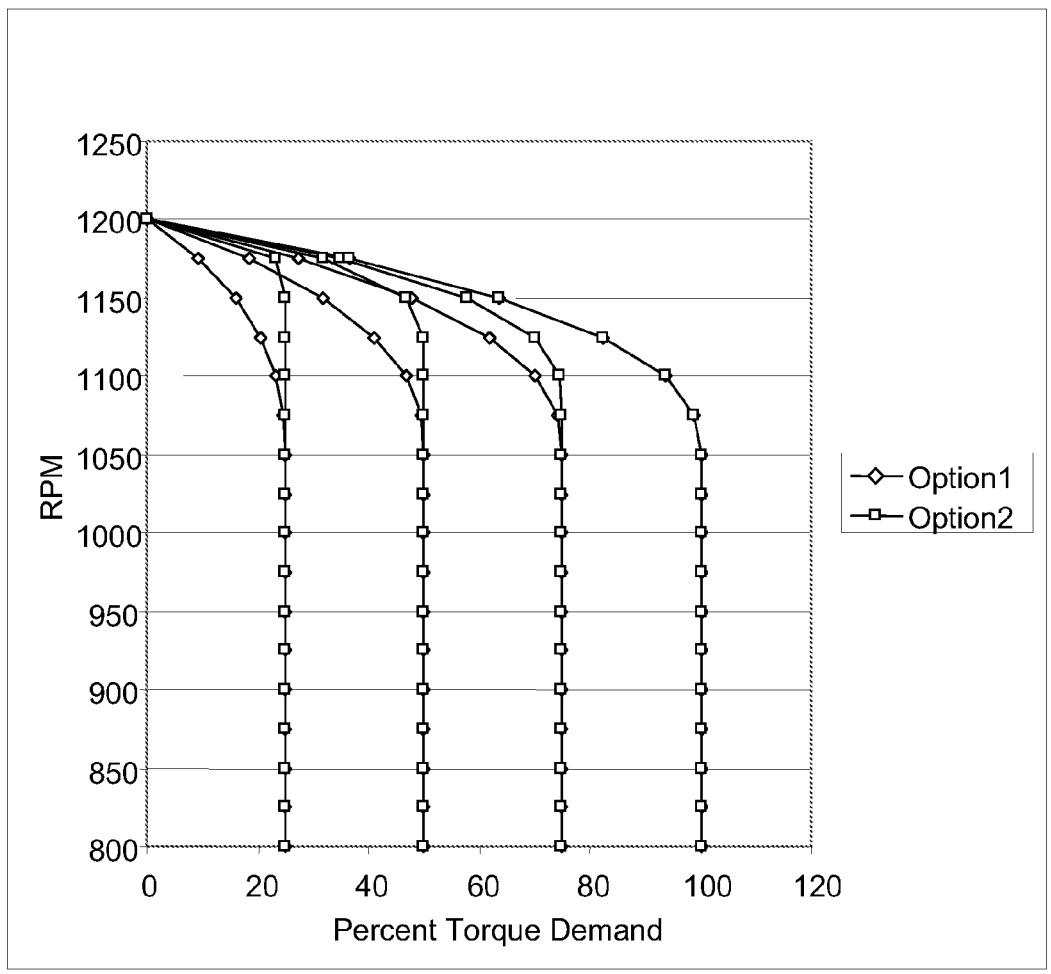
FIG. 6 is a chart illustrating an induction motor speed-torque curve that is programmed into a memory of an ECM.

FIG. 6 is a chart 250 illustrating a specific embodiment of an induction motor speed-torque curve. Chart 250 is illustrative of key characteristic points of an induction motor speed-torque curve that might be stored, for example, within a memory of an ECM control circuit. These key characteristic points include, for example, breakdown speed, noload or synchronous speed, and a shape description number that controls the shape of the curve between the two speeds. In one embodiment, this shape description number is the "n" referred to above. In the embodiment, when the motor speed is between the breakdown speed and the noload speed, the torque is scaled by a factor less than one, that is calculated by the formula above using the shape description number, the breakdown speed, and the noload speed. At the same time, the allowed rate of change of the motor torque is reduced, in order to guarantee dynamic stability.

If the operating range of an ECM can be constrained to operate with characteristics similar to the operating characteristics of an induction motor, then at least some of the re-rating activity described above with respect to the replacement of an induction motor with an ECM can be eliminated.

While the invention has been described in terms of various specific embodiments, those skilled in the art will recognize that the invention can be practiced with modification within the spirit and scope of the claims.

What is claimed is:

1. A method for emulating induction motor operation using an electronically commutated motor (ECM), said method comprising:
   receiving, at the ECM, a desired operating torque;
   accessing induction motor operating characteristics stored within the ECM;
   calculating a new torque demand if a speed associated with the desired operating torque is greater than a breakdown speed of the induction motor being emulated;
   setting an output torque for the motor substantially equal to the torque demand for the motor if the speed associated with the desired operating torque is less than the breakdown speed of the induction motor being emulated;
   moving the output torque toward the demanded torque if not substantially equal; and
   operating the ECM at the output torque.

2. A method according to claim 1 wherein calculating a new torque demand comprises calculating a new torque demand based on the desired operating torque.

3. A method according to claim 2 wherein calculating a new torque demand comprises calculating a new torque demand as a function of at least one of desired operating torque, motor operating speed, induction motor breakdown speed, induction motor no load speed, and an exponential value.

4. A method according to claim 3 wherein calculating a new torque demand as a function comprises calculating a new torque demand according to:

$$\text{Desired operating torque} \times \left[ 1 - \frac{(\text{i.m. operating speed} - \text{i.m. breakdown speed})^n}{(\text{i.m. noload speed} - \text{i.m. breakdown speed})^n} \right].$$

5. A method according to claim 4 where n=2.5, motor noload speed is 1200 revolutions per minute (rpms), and motor breakdown speed is 1050rpms.

6. A method according to claim 4 where the induction motor (i.m.) breakdown speed is calculated according to:

$$\text{i.m. noload speed} - \text{per unit torque demand} \times (\text{i.m. noload speed} - \text{i.m. breakdown speed}).$$

7. A method according to claim 1 wherein operating the motor at the output torque comprises operating the motor at the output torque if the output torque is substantially equal to the demanded torque.

8. A method according to claim 1 wherein moving the output torque toward the demanded torque comprises stepping the output torque toward the demanded torque.

9. A method according to claim 1 further comprising repeating the steps beginning at a next processing time slot.

10. An electronically commutated motor comprising:
    a permanent magnet DC brushless motor comprising a plurality of external winding connections coupled to an external surface of said electronically commutated motor, at least one stator winding electrically coupled to said plurality of external winding connections;
    an electronic commutator, said electronic commutator electrically coupled to said motor; and
    a control circuit programmed with motor operating characteristics that cause said permanent magnet DC brushless motor to emulate operation of an induction motor, said control circuit comprising a processor and a memory, said processor programmed to;
    access motor operating characteristics stored within said memory;
    calculate a new torque demand if a speed associated with a desired operating torque is greater than a breakdown speed of the emulated motor;
    set an output for said electronically commutated motor substantially equal to the torque demand if the speed associated with the desired operating torque is less than the breakdown speed of the emulated induction motor;
    move the output torque toward the demanded torque if not substanially equal; and
    cause said electronically commutated motor to operate at the output torque.

11. An electronically commutated motor according to claim 10 wherein said processor is programmed to calculate a new torque demand based on the desired operating torque.

12. An electronically commutated motor according to claim 11 wherein said processor is programmed to calculate a new torque demand as a function of at least one of desired operating torque, motor operating speed, induction motor breakdown speed, induction motor no load speed, and an exponential value.

13. An electronically commutated motor according to claim 12 wherein said processor is programmed to calculate a new torque demand according to:

$$\text{Desired operating torque} \times \left[ 1 - \frac{(\text{i.m. operating speed} - \text{i.m. breakdown speed})^n}{(\text{i.m. noload speed} - \text{i.m. breakdown speed})^n} \right].$$

14. An electronically commutated motor according to claim 13 wherein induction motor (i.m.) breakdown speed is calculated according to:

$$\text{i.m. noload speed} - \text{per unit torque demand} \times (\text{i.m. noload speed} - \text{i.m. breakdown speed}).$$

15. An electronically commutated motor according to claim 10 wherein said processor is programmed to operate said electronically commutated motor at the output torque if the output torque is substantially equal to the demanded torque.

16. An electronically commutated motor according to claim 10 wherein to move the output torque toward the demanded torque, said processor is programmed to step the output torque toward the demanded torque.

* * * * *